(12) United States Patent
Rathinasamy et al.

(10) Patent No.: US 11,736,206 B2
(45) Date of Patent: *Aug. 22, 2023

(54) USE OF SILICON PHOTONICS (SiP) FOR COMPUTER NETWORK INTERFACES

(71) Applicant: Dell Products L.P., Round Rock, TX (US)

(72) Inventors: Shree Rathinasamy, Round Rock, TX (US); Victor B. Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

This patent is subject to a terminal disclaimer.

(21) Appl. No.: 17/167,758

(22) Filed: Feb. 4, 2021

(65) Prior Publication Data

US 2021/0297163 A1    Sep. 23, 2021

Related U.S. Application Data

(63) Continuation of application No. 16/823,566, filed on Mar. 19, 2020, now Pat. No. 10,951,325.

(51) Int. Cl.
*H04B 10/80* (2013.01)
*G06F 13/40* (2006.01)
*H04Q 11/00* (2006.01)
*G02B 6/42* (2006.01)

(52) U.S. Cl.
CPC ............ *H04B 10/801* (2013.01); *G02B 6/42* (2013.01); *G02B 6/4246* (2013.01); *G06F 13/4027* (2013.01); *H04Q 11/0005* (2013.01); *H04Q 2011/0039* (2013.01); *H04Q 2011/0041* (2013.01)

(58) Field of Classification Search
CPC ...... H04B 10/801; G02B 6/42; G02B 6/4246; G06F 13/4027; H04Q 11/0005; H04Q 2011/0039; H04Q 2011/0041
See application file for complete search history.

(56) References Cited

U.S. PATENT DOCUMENTS

| | | | |
|---|---|---|---|
| 6,785,142 B1 | 8/2004 | Regimbal et al. | |
| 7,411,973 B2 | 8/2008 | McDaniel et al. | |
| 7,529,485 B2* | 5/2009 | Farmer | H04J 14/0232 398/71 |
| 8,693,208 B2 | 4/2014 | Reinke et al. | |
| 8,838,286 B2 | 9/2014 | Florez-Larrahondo et al. | |
| 8,891,561 B2 | 11/2014 | Masood et al. | |
| 8,990,824 B2 | 3/2015 | Nilakantan et al. | |
| 9,116,313 B2 | 8/2015 | Traverso et al. | |
| 9,548,809 B1* | 1/2017 | Nagarajan | H04B 10/40 |

(Continued)

OTHER PUBLICATIONS

Dell PowerEdge MX7000 Technical Guide (Dell Inc. 2018, Aug. 2018).

(Continued)

*Primary Examiner* — Mina M Shalaby
(74) *Attorney, Agent, or Firm* — Joseph Mencher

(57) ABSTRACT

A silicon photonics (SiP) chip includes MAC and PHY blocks interconnected by optical waveguides (560) to provide network interface for a computer system. The SiP chip may be formed in a package mounted to the computer's motherboard. In an example, the computer system is a blade server module mounted in a datacenter chassis.

20 Claims, 11 Drawing Sheets

(56) References Cited

U.S. PATENT DOCUMENTS

| | | | |
|---|---|---|---|
| 9,549,232 B1* | 1/2017 | Nagarajan | H04Q 11/0005 |
| 9,584,884 B1* | 2/2017 | Nagarajan | H04Q 11/0062 |
| 10,135,928 B2 | 11/2018 | Frachtenberg et al. | |
| 10,140,238 B2 | 11/2018 | Mundt et al. | |
| 10,271,455 B2 | 4/2019 | Cho et al. | |
| 2005/0286902 A1* | 12/2005 | Pierce | H04B 10/40 |
| | | | 398/139 |
| 2007/0153823 A1* | 7/2007 | Wojtowicz | H04B 10/40 |
| | | | 370/463 |
| 2011/0116792 A1* | 5/2011 | Blumenthal | H04B 10/40 |
| | | | 398/43 |
| 2011/0150475 A1* | 6/2011 | Soto | H04B 10/2589 |
| | | | 398/63 |
| 2011/0267676 A1* | 11/2011 | Dallesasse | H01S 5/021 |
| | | | 359/279 |
| 2014/0264400 A1 | 9/2014 | Lipson et al. | |
| 2018/0356996 A1* | 12/2018 | Benisty | G06F 3/0653 |
| 2019/0370652 A1* | 12/2019 | Shen | G06N 3/0454 |
| 2019/0384022 A1 | 12/2019 | Chen | |
| 2020/0110992 A1* | 4/2020 | Hosseinzadeh | G06N 3/0472 |

OTHER PUBLICATIONS

PowerEdge Mx I/O Guide: I/O Connectivity Options for the PowerEdge MX Platform (Dell Inc., Sep. 2019, v1.5).

* cited by examiner

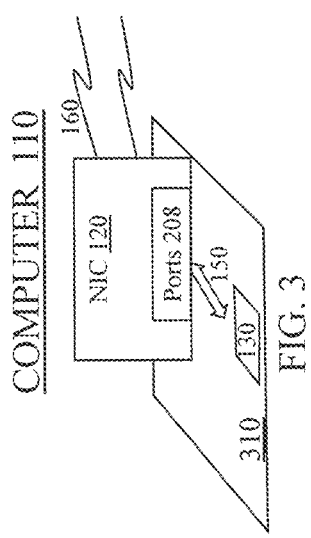

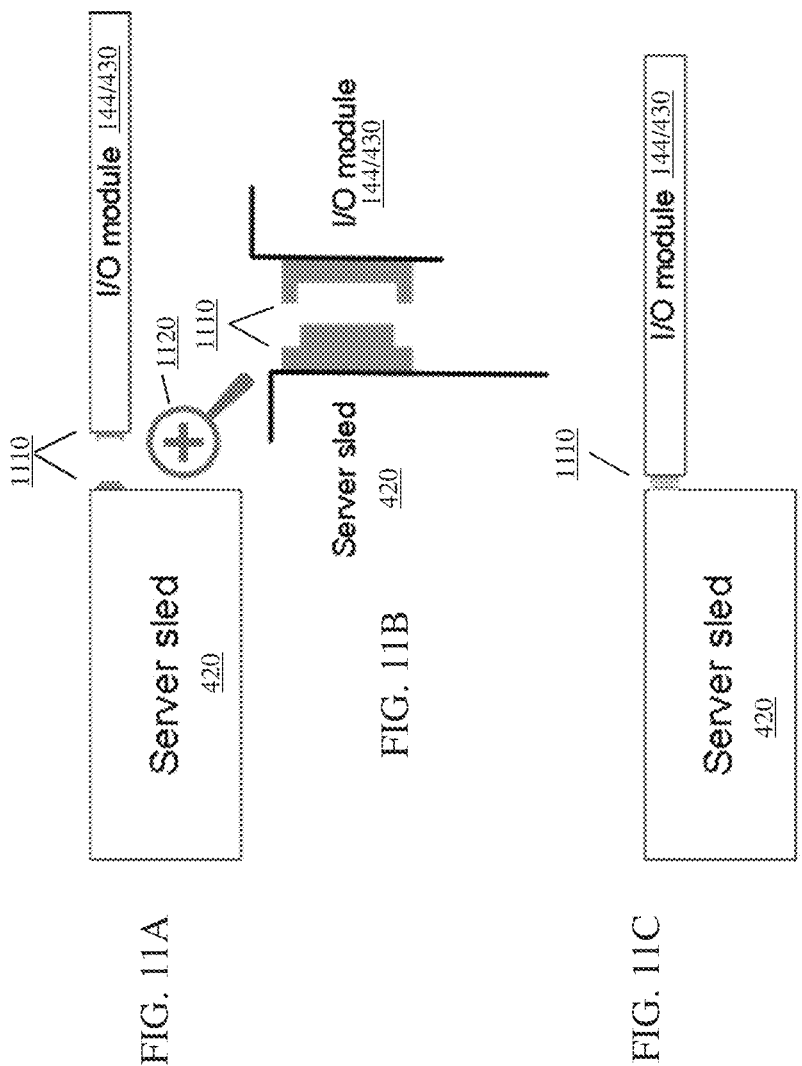

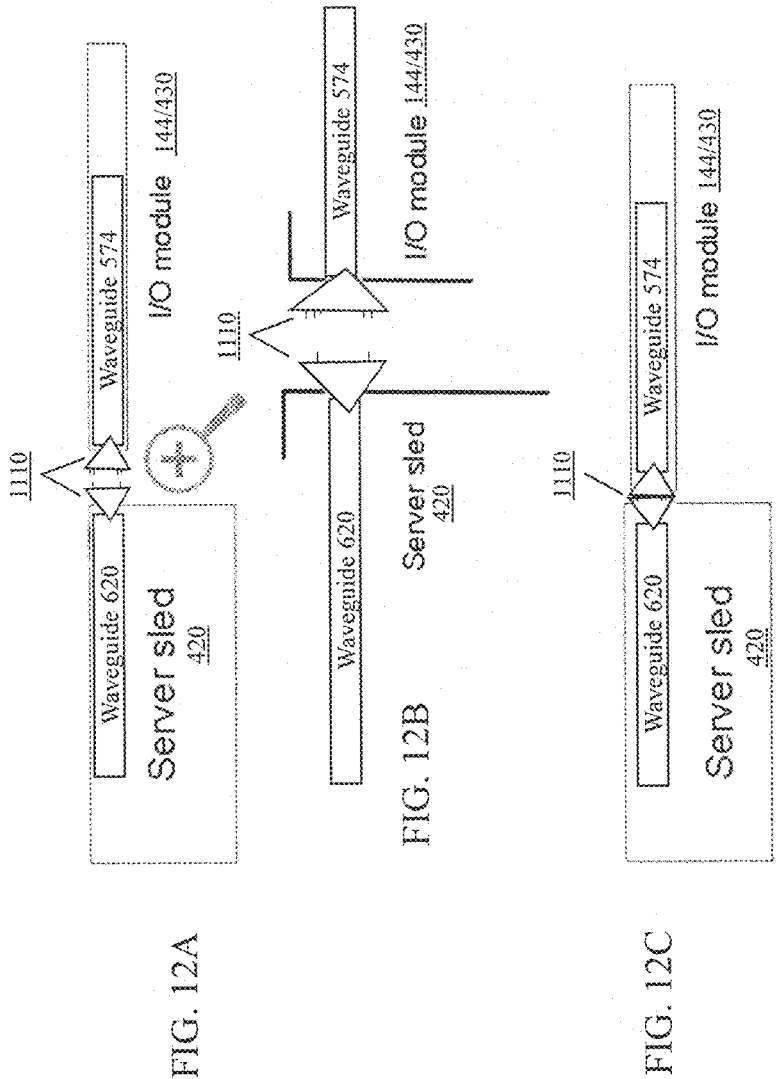

USE OF SILICON PHOTONICS (SIP) FOR COMPUTER NETWORK INTERFACES

CROSS REFERENCE TO RELATED APPLICATIONS

The present application is a continuation of U.S. patent application Ser. No. 16/823,566, filed Mar. 19, 2020, incorporated herein by reference.

BACKGROUND

The present disclosure relates to computer networks.

A computer 110 (FIG. 1) communicates with network 114 via network interface cards (NIC) 120. Computer 110 may have one or more computer processors 130 executing computer instructions stored in memory 134. Memory 134 is also used for data storage. Additional memory 138, e.g. disk drives, solid state drives, etc., may be provided as peripheral storage for data or instructions. Other peripheral devices (not shown) may also be present, e.g. a keyboard, a mouse, a monitor, etc. Conductive bus(es) 150, e.g. copper, interconnect the processors 130, memory 134, memory 138, NICs 120, and possibly other parts of the system.

Each NIC 120 includes one or more ports 120P connected to ports of network switches 144 in network 114 by wired or wireless links 160.

There is a need to adapt the NICs and other network circuitry to dense network installations, e.g. datacenters providing cloud storage and cloud computing, and other installations having many computers 110 (e.g. servers) and switches 144 per unit area. In such installations, multiple computers 110 and switches 144 may be placed on the same rack and/or in the same chassis. Suitable network interfaces are needed to meet the small space and high heat dissipation requirements in dense installations.

SUMMARY

This section summarizes some features of the present disclosure. Other features are described in subsequent sections. The invention is defined by the appended claims.

Some embodiments of the present invention use silicon photonics (SiP) chips instead of separate cards to provide functionality of NICs 120 and/or other circuits. In particular, in some embodiments, the NICs are replaced by chips mounted on the same wiring board (e.g. motherboard) as the processors 130 and/or other computer components, as in LAN-on-motherboard configurations. The SiP chips can be optimized for use in a common chassis with multiple computers 110 and/or switches 144. In some embodiments, a media access controller (MAC) and a physical layer device (PHY) are integrated in the same SiP chip, and interconnected by optical waveguides.

Other embodiments and variations are within the scope of the invention, as defined by the appended claims.

BRIEF DESCRIPTION OF THE DRAWINGS

FIGS. 1, 2, 3 illustrate a network interface system using Network Interface Cards (NICs).

FIGS. 11A, 11B, 11C illustrate mechanical coupling between a module with a SiP chip and another module in a chassis.

FIGS. 12A, 12B, 12C illustrate optical coupling between a module with a SiP chip and another module in a chassis.

DETAILED DESCRIPTION

This section describes some embodiments in detail. The invention is not limited to such embodiments, but is defined by the appended claims.

Figure 1:
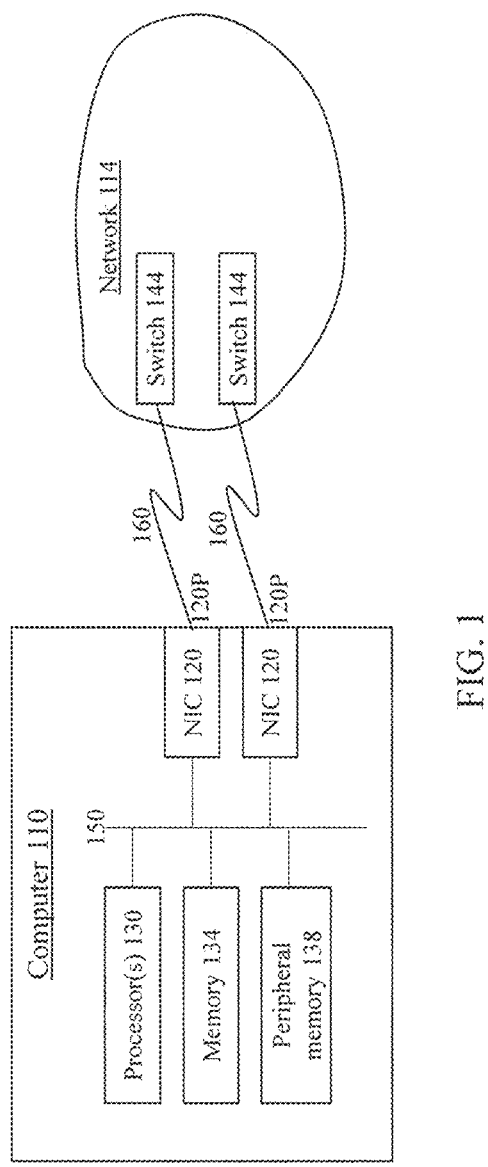
Figure 2:
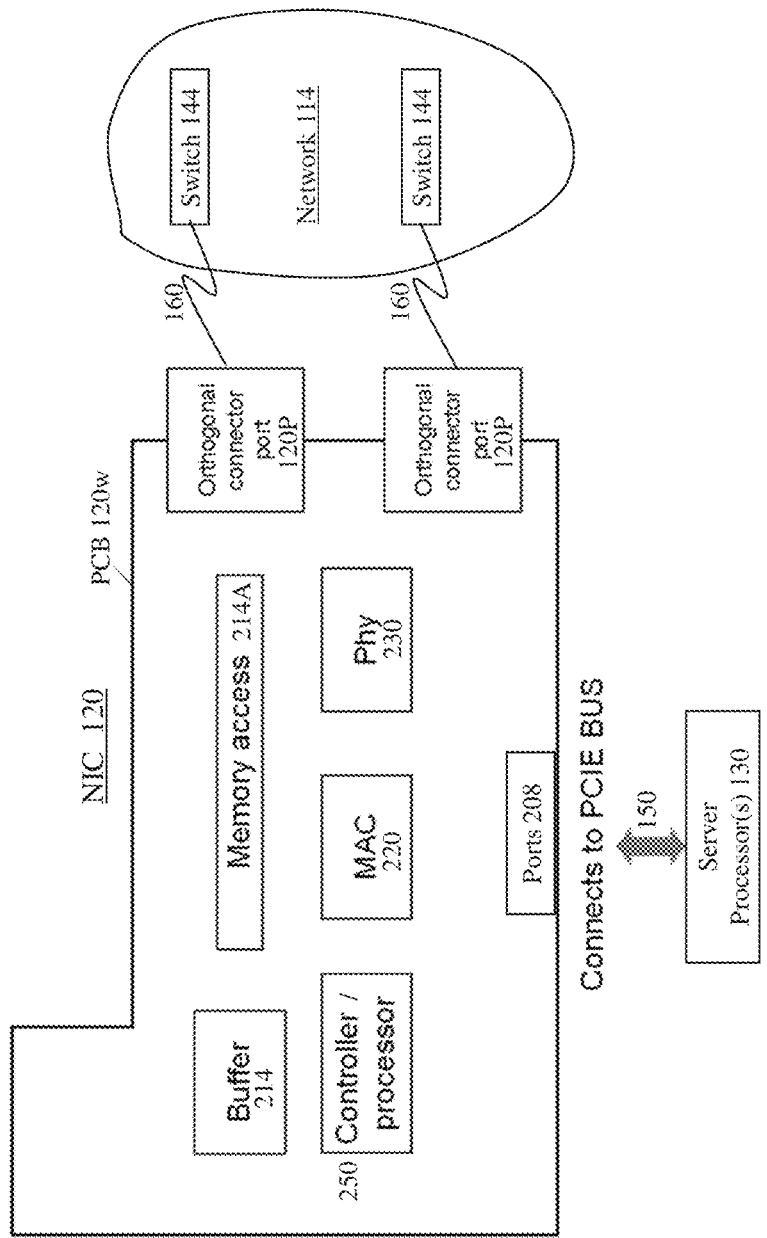

FIG. 2 illustrates a conventional NIC 120 for a computer 110. Computer 110 may be a server in a datacenter. NIC 120 has one or more ports 208 connected to bus(es) 150, which connect the NIC to other parts of the system, e.g. processors 130, memories 134 and 138, and possibly other components (FIG. 1). Buses 150 can be of type PCIE (PCI Express); see U.S. Pat. No. 8,693,208, issued Apr. 8, 2014, incorporated herein by reference. Other bus types can also be used. The data received by NIC 120 on a port 208 for transmission to network 114 may be temporarily buffered in memory 214. The access to memory 214 may be controlled by memory access circuit 214A (e.g. Direct Memory Access (DMA) controller or some other type). Medium access controller (MAC) circuit 220 organizes the transmit data in buffer 214 into digital frames that may also include source and destination addresses, checksums, and other information as required by the MAC protocol in use. MAC 220 may also change data encoding (e.g. supply extra bits for proper DC balance), and may perform other functions required by the MAC protocol. Physical layer device (PHY) 230 converts the digital data frames into analog form as needed for transmission on links 160. (Ports 120P may or may not be viewed as part of PHY 230.) PHY 230 may perform other functions required by the physical layer protocol in use, e.g. perform link acquisition.

The receive data flow is reversed. PHY 230 converts the received analog data into digital frames. Upon recognizing a suitable destination address in a frame, MAC 220 may store the frame's data in buffer 214. The frames' data are read out of buffer 214 to ports 208 under control of memory access circuit 214A.

Controller or processor 250 may perform management functions, e.g.: report the status of NIC 120 and/or links 160 to a management program executed by computer 110 or some other computer; program MAC 220 and PHY 230 with suitable firmware or software or operation parameters; perform data filtering for security or other reasons; and possibly other functions. See for example U.S. Pat. No. 10,135,928, issued Nov. 20, 2018 (inventors: Frachtenberg et al.); and U.S. Pat. No. 7,411,973, issued Aug. 12, 2008 (inventors: McDaniel et al.); both incorporated herein by reference.

NIC 120 may be implemented as a chip set mounted on a card 120w. Card 120w is a rigid printed circuit board (PCB) 120w having printed electrical interconnects (e.g. copper; not shown) interconnecting the components 214-230 as needed. Card 120w may be inserted, at the side with ports 208, in a slot on a PCB 310 (FIG. 3), e.g. a motherboard, on which one or more other computer components 130, 134, 138, etc. (FIG. 1) are mounted. Buses 150 can be printed lines on PCB 310. Alternatively, rather than being inserted in a slot in PCB 310, NICs 120 can be attached to mezzanine risers (not shown) mounted on PCB 310, to position the NICs parallel to motherboard 310; see U.S. Pat. No. 10,140,238, issued Nov. 27, 2018 (inventors: Mundt et al.), incorporated herein by reference.

In datacenters, network switches 144 are typically several feet, several yards, or further away from servers 110. The servers' NICs 120 are used for traditional floor, rack, as well as modular servers. The NICs are relatively high-maintenance devices requiring proper handling, frequent updates, and suitable knowledge on how to use them. For many server types, NICs are the required hardware for the foreseeable future. As with most hardware, traditional NICs present several problems:

1. Mechanical failures, and other wear and tear.
2. NICs require driver updates. (The drivers are software executed by processor 130 and/or 250).
3. NICs require firmware updates. (The firmware is software executed by one or more of processor 250, MAC 220, PHY 230.)
4. NICs require power from servers 110.
5. Additional cooling is required for a NIC.
6. NICs take up space/slots in servers 110 (the slot into which the NIC is inserted; see FIG. 3).
7. NICs cause data transfer latencies.
8. NICs need to be handled; swapped out or reseated.
9. There is often server downtime when a NIC is handled.
10. Servers 110 must be opened (or pulled) to install or replace a NIC.
11. Multiple points of failure are possible on both ends (208 and 120P) of the NIC.
12. Users can damage a NIC when installing or removing it.
13. ESD (Electro-Static Discharge) may damage NICs.
14. Users can be injured when installing or removing a NIC.
15. Third party NIC vendors can be required.
16. NICs can block air flow to other devices.

Figure 4:
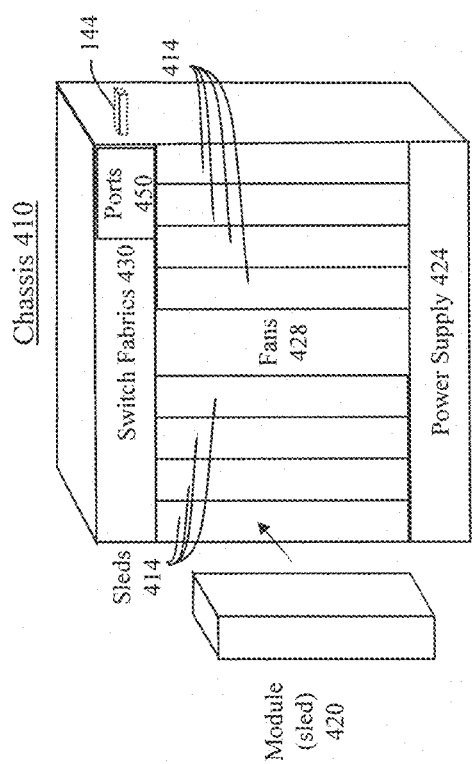
FIG. 4 illustrates a chassis interconnecting multiple modules.

Therefore, improved network interfaces are desired, especially in network installations having multiple servers 110 made as modular structures mounted in a single chassis in a multi-chassis rack. FIG. 4 illustrates an exemplary chassis 410, which includes a number of sleds (slots) 414 (eight sleds in the example shown) for modules 420. (Confusingly, the term "sled" can be used both for slots 414 and modules 420.) Each module 420 is a thin module, occupying a single sled 414 or two adjacent sleds. Modules 420 can be storage modules or compute modules. A compute module 420 may be a server (possibly a blade server, i.e. a thin server module with possibly limited functionality), such as 110 in FIG. 1. A storage module 420 may be SAS (Serial Attached SCSI) storage, with Hard Disk Drives (HDD) or Solid State Drives (SSD). A common power supply 424 and common cooling fans 428 provide power and cooling to all the sleds 414. For example, power supply 424 may receive AC power from a standard electrical outlet (110V/60 Hz), and provide DC power to all other parts in chassis 410, including modules 420, switch fabrics 430 (described below), I/O modules (switches) 144, and possibly others.

Switch fabrics 430 are provided at the top and/or bottom of chassis 410. The switch fabrics interconnect the modules 420 in chassis 410, as well as other (non-sled) modules in the chassis. A non-sled module example is an I/O module including a switch 144. A NIC 120 of a sled module 420 may plug into both the module's PCB 310 (as in FIG. 3) and into a PCB (not shown) of a switch fabric 430 or a switch module 144. The switch fabrics 430 may or may not be viewed as part of switches 144. A number of ports 450 connect the switch fabrics 430 and/or switches 144 to network nodes outside of chassis 410, e.g. to modules (possibly switches) in the same or different chassis, possibly in the same rack or other racks (multiple chassis can be placed in a single rack if desired).

A chassis may include a backplane or a midplane into which the modules 420, 144, and/or 430 are plugged. See U.S. Pat. No. 10,271,455 (issued Apr. 23, 2019; inventors: Cho et al.); and U.S. Pat. No. 6,785,142 (issued Aug. 31, 2004; inventors: Regimbal et al.); all of which are incorporated herein by reference. Some chassis do not include either a backplane or a midplane. An example is a chassis of type PowerEdge MX7000 (Trademark) available from Dell Inc. having a place of business in Texas, United States of America. See Dell EMC Technical Guide, PowerEdge MX7000 (Dell Inc. 2018, 2018-08), available at the Internet address (URL) https://www.google.com/url?sa=t&rct=j&q=&esrc=s&source=web&cd=2&cad=rja&uact=8&ved=2ahUKEwj-j-ba0_LnAhXBqp4KHU34CQAQFjABegQIAxAB&url=https%3A%2F%2Fi.dell.com%2Fsites%2Fcsdocuments%2FProduct_Docs%2Fen%2Fdell_emc_poweredge_mx7000_technical_guide.pdf&usg=AOvVaw0w_2g-XajwZeNeYce87Ea0, incorporated herein by reference.

Many chassis types, including PowerEdge MX7000, use orthogonal (as in FIG. 3) or mezzanine NICs. Such NICs may have reliability and/or other problems listed above.

Orthogonal or mezzanine NICs can be replaced by chips mounted on motherboard 310 ("LAN-on-motherboard"); see U.S. Pat. No. 8,891,561, issued Nov. 18, 2014 (inventors: Masood et al.), incorporated herein by reference.

According to some embodiments of the present disclosure, at least some of LAN-on-motherboard implementations use silicon photonics (SiP) technology. SiP chips are described, for example, in U.S. Pat. No. 9,116,313, issued Aug. 25, 2015 (inventors: Traverso et al.), incorporated herein by reference; U.S. patent publication no. 2019/0384022, published Dec. 19, 2019 (inventor: Chen), incorporated herein by reference; U.S. patent publication no. 2014/0264400, published Sep. 18, 2014 (inventors: Lipson et al.), incorporated herein by reference. (The present invention is not limited to any particular SiP technology.) For example, the aforementioned U.S. Pat. No. 9,116,313 describes a PHY device implemented in a SiP chip that may include both electrical and optical ports for interfacing with other electrical or optical circuits.

A specific choice of optical and electrical circuits to be implemented in a SiP chip may affect the cost, size, power consumption, heat dissipation, and reliability of various parts of the system. Some embodiments described below are suitable for dense network installations such as blade servers 420 in chassis 410 or other close-spaced installations, in which multiple modules 420 and/or 144 may share a power supply 424 and/or cooling fans 428 and/or other cooling arrangements. However, the invention is not limited to a particular chassis type described above in connection with FIG. 4 (e.g. to specific modules or module positions in the chassis), or to using chassis, or to dense installations.

A SiP chip can be mounted on a board 310, and connected to bus(es) 150, using any suitable technology. The SiP chip may have electrical ports directly attached to board 310. The attachment methods may include wire bonding, flip-chip technology, surface-mount technology, ball grid array technology, and/or other technologies. For example, the SiP chip may be stacked on top of another interposer chip that provides electro-optical conversion between buses 150 and the SiP chip. In addition or in the alternative, the SiP chip may be attached to optical waveguides, e.g. made of polymer and/or glass and/or other materials deposited directly on board 310, and/or made as optical fiber cables not integrated with board 310. Such waveguides may provide bus(es) 150.

Figure 5:
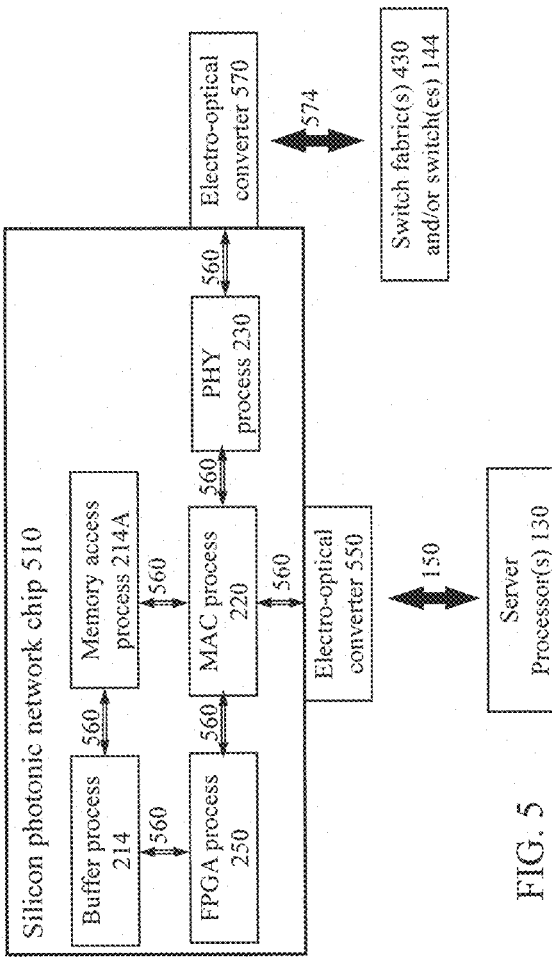
FIG. 5 illustrate a network interface system including a silicon photonic (SiP) chip.

FIG. 5 shows a block diagram of SiP chip 510 according to some embodiments. SiP chip 510 includes operational processes of optical or electrical PHY 230, MAC 220, and controller 250 (possibly implemented as a FPGA (Field Programmable Gate Array)). SiP chip 510 also includes buffer 214 (e.g. packet buffer), memory access process (e.g. DMA) 214A for controlling data transfer between buffer 214 and PHY 230 and/or between buffer 214 and server-side opto-electrical converters 550 connected (possibly directly attached) to buses 150 on PCB 310. Buses 150 may be PCIE or other types. SiP chip 510 may also include other types of optical and/or electrical circuitry. In some embodiments, the parts 230, 220, 250, 214, 214A provide the functionality described above for the NIC of FIG. 2.

Optical waveguides 560 interconnect the SiP function blocks as needed to carry data and/or control signals. In FIG. 5, optical waveguides 560 are shown as directly interconnecting the following pairs of circuits: FPGA process 250 and buffer process 214; FPGA process 250 and MAC process 220; MAC process 220 and DMA process 214A; DMA 214A and buffer 214; MAC 220 and PHY 230; MAC 220 and opto-electrical converters 550; and PHY 230 and switch-side opto-electrical converters 570. Converters 570 are connected, via a circuit 574, to fabric(s) 430 and/or switch(es) 144 (FIG. 4). Circuit 574 may include electrical (e.g. copper) interconnects and/or digital-to-analog (DAC) and analog-to-digital (ADC) converters. In some embodiments, any of optical waveguides 560 may be absent, and/or additional optical waveguides 560 may be present.

Some benefits of using the SiP technology include low heat, low power consumption, high speed, and small size. The logic functions implemented by SiP chip 510 can be programmed by the manufacturer and/or other parties including possibly the customers using the SiP chip.

Figure 6A:
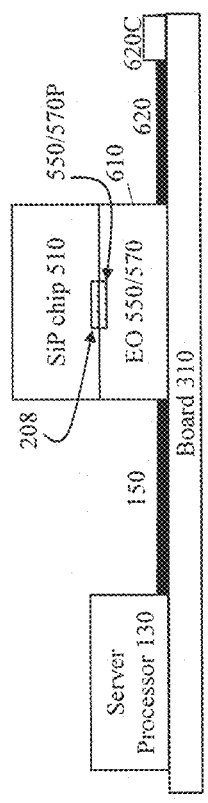
FIGS. 6A and 6B illustrate packaging schemes for a network interface system with a SiP chip.
Figure 6B:
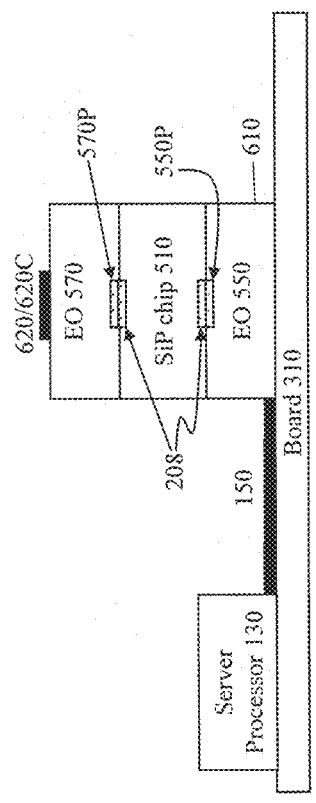

Electro-optical converters 550, 570 can be integrated into SiP chip 510, or can be implemented by separate chips and/or discrete parts. Separate chip implementation is illustrated in FIGS. 6A, 6B. In FIG. 6A, the converters 550, 570 are part of interposer 610, which can be a ball grid array or other type of substrate, possibly a semiconductor chip or wafer, possibly a SiP chip or wafer. Interposer 610 is mounted directly on board 310, which is the same board on which the server processor 130 and/or other components of computer 110 (FIG. 1) are mounted. SiP chip 510 is mounted on interposer 610. Interposer 610 has optical ports 550/570P at the top, which are part of corresponding converters 550/570. These optical ports are aligned, and optically coupled, with ports 208 at the ends of waveguides 560 in SiP chip 510 (e.g. the waveguides leading to MAC 220 and PHY 230). Interposer 610 has electrical contacts (not shown) on the top and/or bottom that are connected, by direct attach and/or wire bonds, to buses 150, and to bus(es) 620 and/or connector 620C. Bus 620 may include, for example, electrical conductors printed on board 310, terminating at mechanical connector 620C that plugs into a mating connector (not shown) on a board of an I/O module 430/144. The mating connector is connected to bus/DAC/ADC 574 (FIG. 5).

In the example of FIG. 6B, interposer 610 includes EO 550 but not 570. Interposer 610 has optical ports 550P at the top, which are part of converters 550. These optical ports are aligned, and optically coupled, with server-side ports 208 at the ends of waveguides 560 in SiP chip 510 (e.g. the waveguides leading to MAC 220). Interposer 610 has electrical contacts (not shown) on the top and/or bottom that are connected, by direct attach and/or wire bonds, to buses 150.

EO 570 is on a separate chip or wafer (possibly SiP chip) attached to the top surface of SiP chip 510. EO 570 has optical ports 570P aligned, and optically coupled, with the switch-side optical waveguides 560 (e.g. leading to PHY 230). EO 570 also has electrical ports connected to a cable and/or connector 620/620C. Connector 620C may plug into a board of an I/O module 430/144 to couple to bus/DAC/ADC 574, as described above in connection with FIG. 6A. The invention is not limited to the packaging techniques of FIGS. 6A, 6B.

An exemplary embodiment may include both optical and electrical buses 150, and/or both optical and electrical buses 574. The converters 550 are provided for the electrical buses 150, and converters 570 are provided for the electrical buses 574. Converters 550, 570 are omitted if buses 150, 574 are optical.

Figure 7:
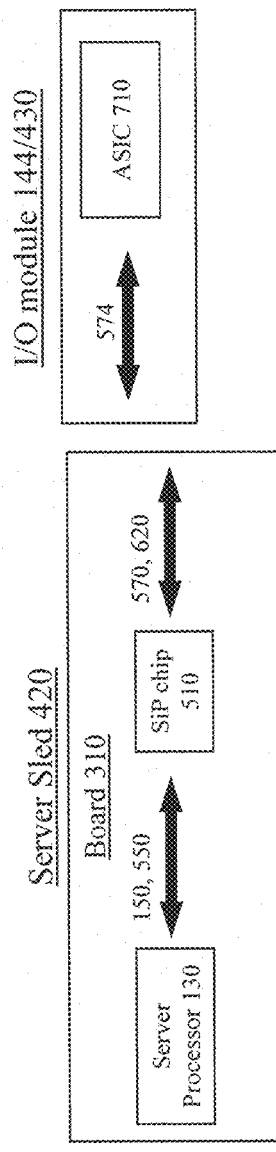
FIG. 7 illustrates a chassis interconnection scheme for a network interface system with a SiP chip.

The design of FIG. 5 fits into the current operational model of some chassis, including the aforementioned PowerEdge MX7000. The design of FIG. 5 is therefore an easy assimilation into the current designs used for the server sled motherboards. See FIG. 7 for example, where "ASIC 710" is an Application Specific Integrated Circuit, which is used in an exemplary implementation of fabric/switch module 144/430.

Figures 8A, 8B:
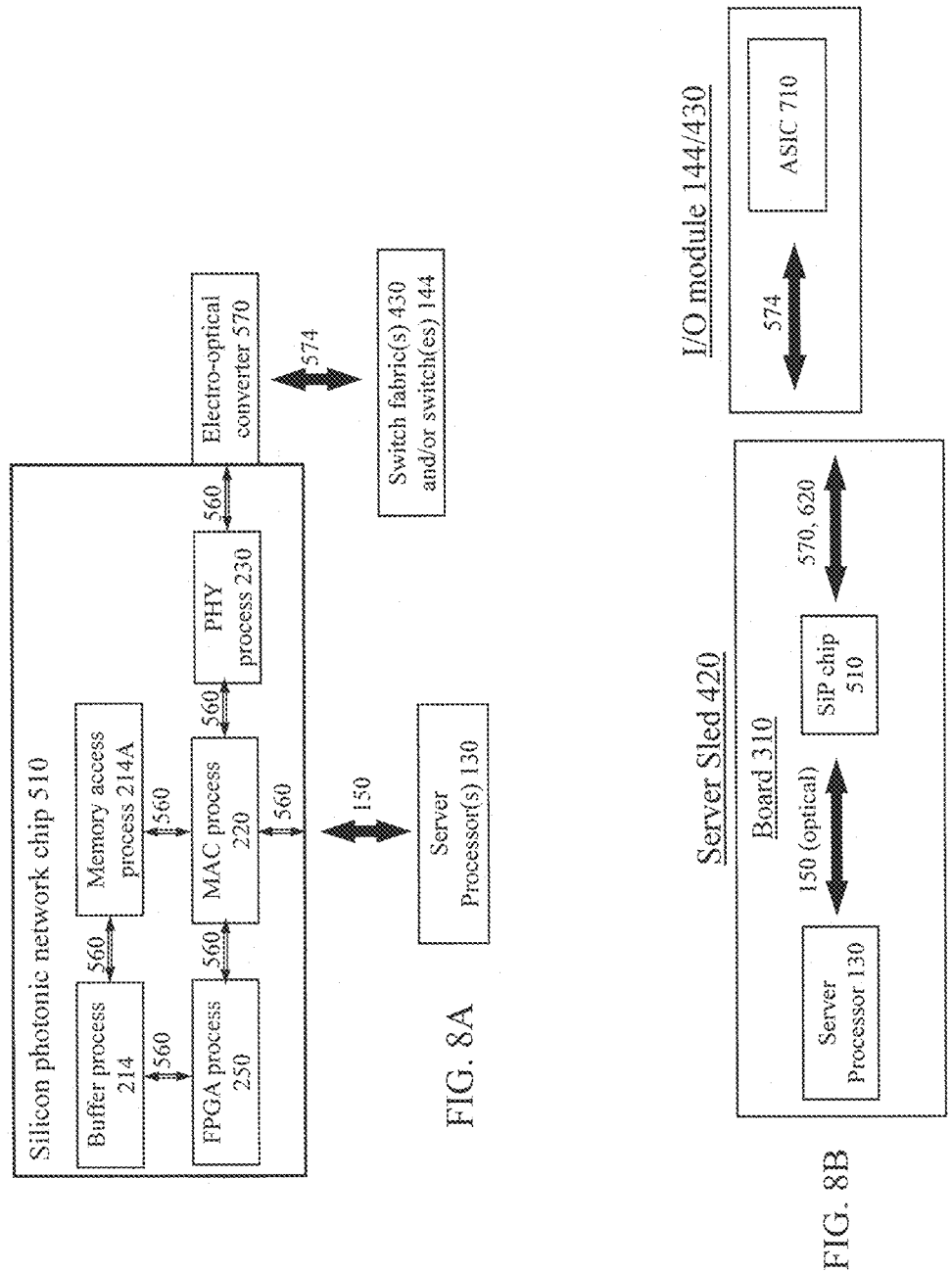
FIG. 8A illustrates a network interface system including a SiP chip.
FIG. 8B illustrates a chassis interconnection scheme for a network interface system with a SiP chip.

FIGS. 8A, 8B shows the system with SiP chip 510 having all optical buses 150 (e.g. optical PCIE bus) at the interface with chip 510. Converters 550 are omitted. In some embodiments, processor(s) 130 are optical, and their supporting circuitry (e.g. memory controllers, etc.) can optionally also be optical.

Figures 9A, 9B:
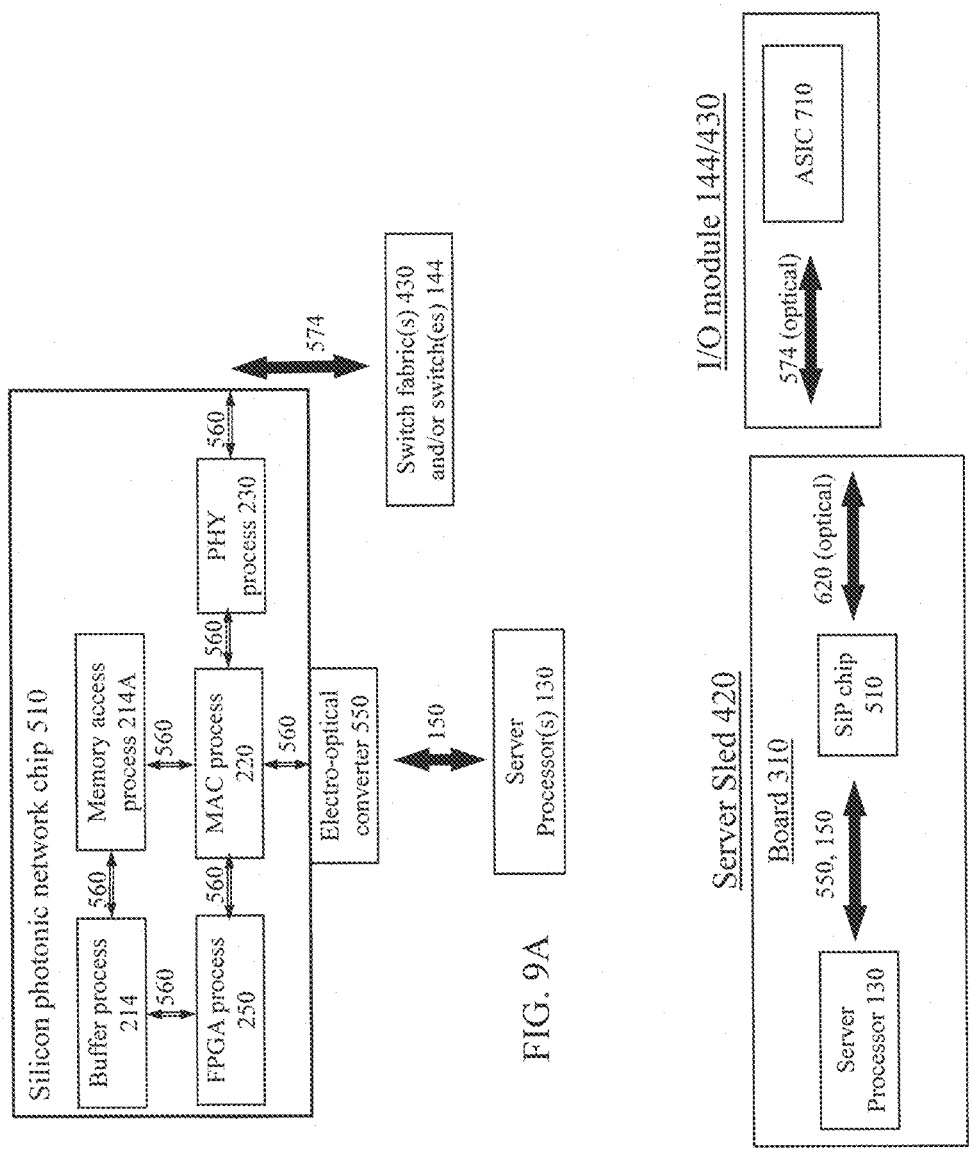
FIG. 9A illustrates a network interface system including a SiP chip.
FIG. 9B illustrates a chassis interconnection scheme for a network interface system with a SiP chip.

In FIGS. 9A, 9B, converters 550 are present because at least some buses 150 are electrical, but converters 570 are absent because the connections to switch fabrics 430 and/or switches 144 are optical. Switch fabric 430 and switches 144 may or may not be optical.

Figure 10A:
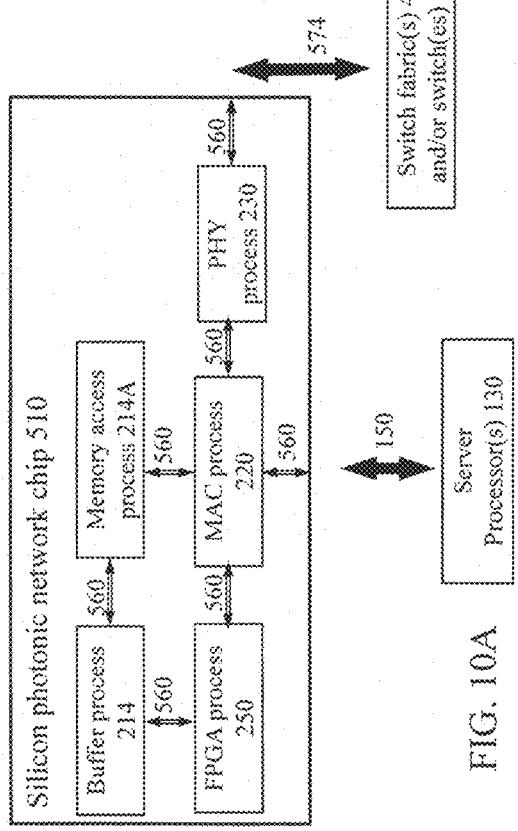
FIG. 10A illustrates a network interface system including a SiP chip.
Figure 10B:
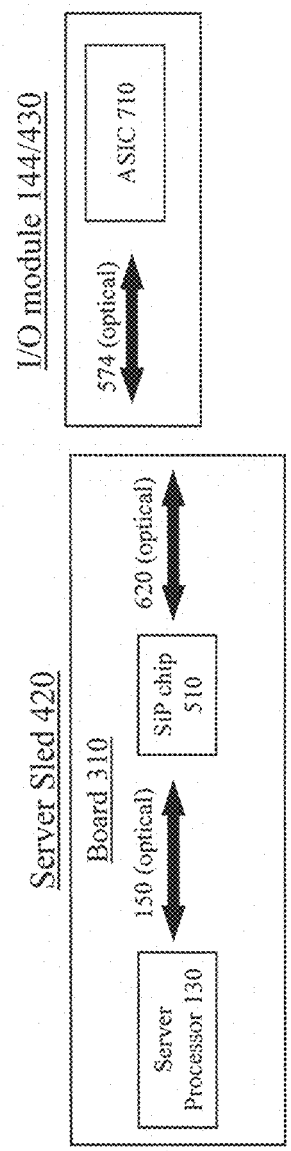
FIG. 10B illustrates a chassis interconnection scheme for a network interface system with a SiP chip.

FIGS. 10A, 10B illustrate a possibly all photonic design from the optical server processor(s) 130 on server sled 420 to optical ASIC 710 on the I/O module 430/144. SiP chip 510 uses photonic input and output to process the optical signals.

Some embodiments of the structures of FIG. 5 to FIG. 10B do not use NICs as an interconnect between server sled 420 and I/O module 144/430. The interconnections between modules 420 and 144/430 can be via electrical and/or optical couplers provided in parts 620C and 574. An electromechanical coupler 1110 is illustrated in FIG. 11A (before coupling), FIG. 11B (enlarged view of coupler 1110 of FIG. 11A; symbol 1120 indicated enlargement), and FIG. 11C (coupled structure).

Optical coupler 1110 is illustrated in FIG. 12A (before coupling), FIG. 12B (enlarged view of coupler 1110 of FIG. 12A), and FIG. 12C (coupled structure).

In some embodiments, a silicon photonic network chip 510 provides several benefits, circumventing many problems and limitations of the traditional NIC for modular chassis, including one or more, possibly all, of the following.

1. Less wear and tear or mechanical failures.
2. No vendor driver updates.
3. No vendor firmware updates.
4. More energy efficient due to less electrical requirements.
5. More energy efficient due to less cooling requirements.
6. Frees up space and slots previously required.
7. Data transfer latencies are minimized.
8. No NICs to be handled, swapped out, or reseated.
9. Network access to server down due to NIC maintenance is eliminated.
10. Servers no longer need to be opened to install or replace a NIC.
11. Points of failure are fewer than with a NIC.
12. Part is not user-replaceable and less susceptible to damage from user error.
13. ESD damages due to user error are minimized.
14. Injuries installing or removing a NIC are eliminated.
15. Third party virtual NIC vendors are optional.
16. Air flow to other devices is maximized.

Figure 13:
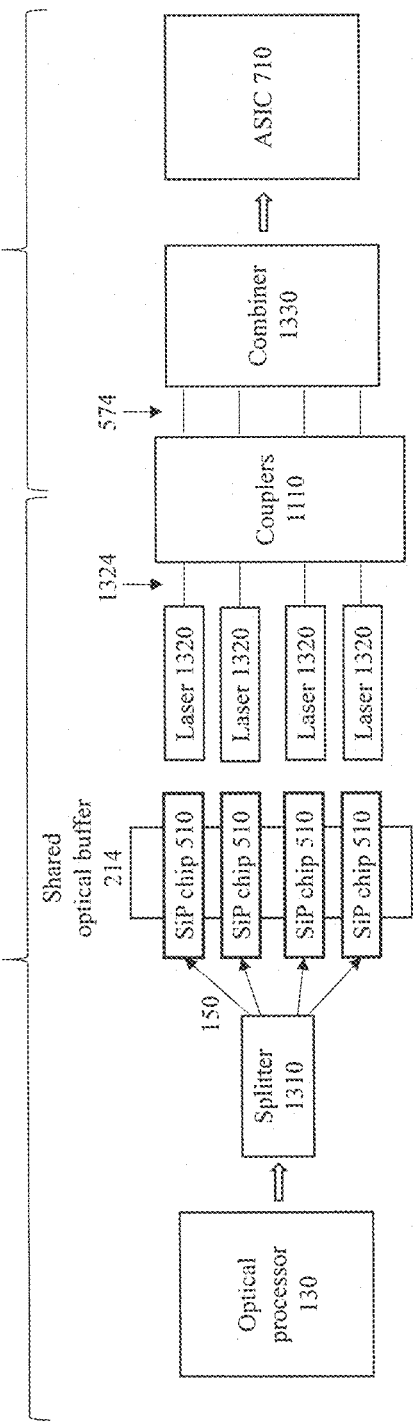
FIGS. 13 and 14 illustrate a network interconnection scheme between a multichannel module or modules with SiP chips and another module, possibly in the same chassis.

FIG. 13 illustrates a multi-channel optical communication system for compute module 420 (e.g. computer 110) and I/O module 144/430. There are four channels in FIG. 13, but any number of channels can be present. One SiP chip 510 is provided for each channel, i.e. four SiP chips total. The SiP chips are as in FIG. 10A: the chip interfaces are optical. Buffers 214 are taken out of the SiP chips, and are provided by off-chip as a shared buffer 214, possibly a separate semiconductor chip or chip set, or disk, or some other storage. The buffer 214 is shared by the four channels.

For all the channels, the data output by optical processor 130 are provided in a shared optical waveguide to beam splitter 1310, which splits the data into individual optical buses 150 for the respective channels. In each channel, the bus 150 is connected to respective SiP chip 510. Each SiP chip's PHY 230 (FIG. 10A) outputs a light beam amplified by a respective laser 1320. The laser output is conducted, by a respective waveguide 1324, to optical couplers 1110 (FIGS. 12A, 12B, 12C), which couple the module 420 to I/O module 144/430. In particular, in each channel, couplers 1110 couple the waveguide 1324 to respective waveguide 574, which guides optical data to combiner 1330. Combiner 1330 combines the four channels into a single optical waveguide, that provides the combined data to optical ASIC 710 (or other circuitry).

On the reverse data path, the data flow is similar: combiner 1330 is replaced by a splitter, and splitter 1310 by a combiner.

Figure 14:
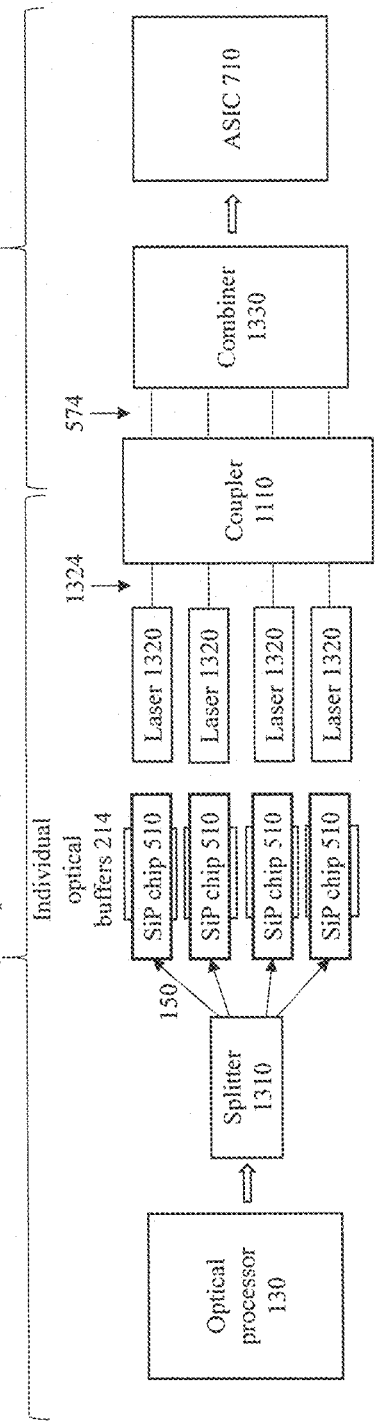

FIG. 14 shows a similar system, except that the shared optical buffer 214 is replaced by individual buffers for each channel. The individual buffers may be provided on respective SiP chips 510, or in separate chips.

In each of FIGS. 13 and 14, the parts 130, 1310, 510, 214, 1320, 1324 are mounted on a single PCB in some embodiments.

The invention is not limited to the embodiments discussed above. Some aspects of the invention are defined by the following clauses:

Clause 1: An apparatus comprising a silicon photonics chip (SiP chip) comprising a network interface circuit for communicating over a network with devices outside of the SiP chip;
wherein the network interface circuit comprises:
a plurality of function blocks (e.g. each function block may be one or more of 214, 214A, 250, etc.; in other words, a function block may be a group of multiple function blocks interconnected by waveguides 560 or in some other way); and
one or more optical waveguides (e.g. 560) each of which interconnects two or more of the function blocks;
wherein the function blocks comprise:
a first function block comprising a media access controller (MAC) for communicating over the network; and
a second function block comprising a physical layer interface device (PHY) for communicating over the network.

2. The apparatus of clause 1, wherein the function blocks further comprise a block comprising a controller (e.g. 250) for controlling the network interface circuit.

3. The apparatus of clause 1 or 2 wherein the function blocks further comprise a block comprising a buffer memory for temporarily storing network data flowing through the network interface circuit.

4. The apparatus of any preceding clause wherein the network interface circuit further comprises one or more electrooptical converters for converting between optical data processed by the network interface circuit and electrical data received by the network interface circuit for transmission and/or transmitted by the network interface circuit.

5. The apparatus of any preceding clause wherein the network interface circuit comprises one or more ports (e.g. 208, of the ports of converters 570/570 connected to bus 150 or 574 if the converters are on SiP chip) for connection to one or more circuits outside of the SiP chip.

6. The apparatus of clause 5 wherein the one or more ports are one or more optical ports (e.g. 208) attached to one or more electrooptical converters.

7. The apparatus of clause 5 or 6 wherein the SiP chip is mounted on a wiring board (e.g. PCB 310) comprising a bus (e.g. 150) carrying signals between the SiP chip and a processor (e.g. 130).

8. The apparatus of clause 7 wherein the bus is an optical bus.

9. The apparatus of any preceding clause wherein the SiP chip is part of a module pluggable into a chassis connecting the module to other modules.

10. The apparatus of clause 9 wherein the other modules comprise a network switch fabric.

11. The apparatus of any preceding clause, wherein:
the SiP chip is one of a plurality of SiP chips each of which comprises a network interface circuit for communicating over a network with devices outside of the SiP chips;
wherein the network interface circuit of each SiP chip comprises:
a plurality of function blocks; and
one or more optical waveguides each of which interconnects two or more of the function blocks;
wherein the function blocks of each SiP chip comprise:
a first function block comprising a media access controller (MAC) for communicating over the network; and
a second function block comprising a physical layer interface device (PHY) for communicating over the network.

12. The apparatus of clause 11, further comprising a buffer memory shared by the SiP chips for temporarily storing network data flowing through the network interface circuits.

The invention also includes methods performed by the apparatuses defined by the clauses, and methods of manufacturing the apparatuses defined by the clauses.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An apparatus comprising:
    a silicon photonics chip (SiP chip) including:
        a network interface circuit that is configured to allow the SiP chip to communicate over a network with devices that are located outside of the SiP chip, wherein the network interface circuit includes:
            a media access controller (MAC) that is configured to allow the SiP chip to communicate over the network;
            a physical layer interface device (PHY) that is configured to allow the SiP chip to communicate over the network; and
            one or more optical waveguides that are configured to carry data and/or control signals between the MAC and the PHY.

2. The apparatus of claim 1, wherein the network interface circuit includes:
    a controller that is configured to control the network interface circuit, wherein the one or more optical waveguides are configured to carry the data and/or the control signals to and/or from the controller.

3. The apparatus of claim 1, wherein the network interface circuit includes:
    a buffer memory that is configured to temporarily store network data transmitted through the network interface circuit, wherein the one or more optical waveguides are configured to carry the data and/or the control signals to and/or from the buffer memory.

4. The apparatus of claim 1, wherein the network interface circuit includes:
    one or more electro/optical converters that are configured to convert between optical data processed by the network interface circuit and electrical data received by the network interface circuit.

5. The apparatus of claim 1, wherein the network interface circuit includes:
    one or more ports that are configured to connect to one or more circuits that are located outside of the SiP chip.

6. The apparatus of claim 5, wherein the one or more ports include one or more optical ports that are connected to one or more electro/optical converters.

7. The apparatus of claim 5, wherein the SiP chip is mounted on a wiring board that includes a bus that is configured to carry signals between the SiP chip and a processor.

8. The apparatus of claim 7, wherein the bus includes an optical bus.

9. The apparatus of claim 1, wherein the SiP chip is included in a module that is configured to plug into a chassis in order to connect the module to other modules.

10. The apparatus of claim 9, wherein the other modules are configured to provide a network switch fabric.

11. The apparatus of claim 1, wherein:
    the SiP chip is one of a plurality of SiP chips, wherein each of the plurality of SiP chips include a respective network interface circuit that is configured to allow that SiP chip to communicate over the network with devices that are located outside of that SiP chip, and wherein the respective network interface circuit in each of the plurality of SiP chip includes:
        a respective media access controller (MAC) that is configured to allow that SiP chip to communicate over the network;
        a respective physical layer interface device (PHY) that is configured to allow that SiP chip to communicate over the network; and
        one or more respective optical waveguides that are configured to transmit data and/or control signals between the respective MAC and the respective PHY in that SIP chip.

12. The apparatus of claim 11, further comprising:
    a buffer memory that is shared by the plurality of SiP chips and that is configured to temporarily store network data transmitted through the respective network interface circuits.

13. A method for transmitting data between a computer system and a network, the method comprising:
    (1) transmitting the data from the computer system to the network;
    (2) receiving the data from the network by the computer system, wherein operation (1) includes:
        (1a) receiving the data by a silicon photonics chip (SiP chip) included in the computer system, wherein the SiP chip includes a network interface circuit including:
            a media access controller (MAC) that is configured to allow the SiP chip to communicate over the network;
            a physical layer interface device (PHY) that is configured to allow the SiP chip to communicate over the network; and
            one or more optical waveguides that are configured to transmit data and/or control signals between the MAC and the PHY;
        (1b) operating, by the SiP chip, the MAC and the PHY to transmit the data to the network, and
    wherein operation (2) includes operating the MAC and the PHY to receive the data by the SiP for the computer system.

14. The method of claim 13, wherein the network interface circuit includes:
    a controller that is configured to control the network interface circuit, wherein the one or more optical waveguides are configured to transmit the data and/or the control signals to and/or from the controller.

15. The method of claim 13, wherein the network interface circuit includes:
    a buffer memory that is configured to temporarily store the data in operation (1) or (2).

16. The method of claim 13, wherein the network interface circuit includes:
    one or more electro/optical converters that is configured to convert between optical data processed by the network interface circuit and electrical data received by the network interface circuit.

17. The method of claim 13, wherein the network interface circuit includes:
    one or more ports that are connected to one or more circuits that are located outside of the SiP chip.

18. The method of claim 17, wherein the one or more ports include one or more optical ports that are connected to one or more electro/optical converters.

19. The method of claim 15, wherein the SiP chip is mounted on a wiring board including an optical bus that is configured to carry signals between the SiP chip and a processor in the computer system.

20. The method of claim 13, wherein the computer system is included in a module that is plugged into a chassis and that connects the network interface circuit to a network switch fabric provided in the chassis.

* * * * *